United States Patent
Nakagawa et al.

(10) Patent No.: US 7,333,048 B2
(45) Date of Patent: Feb. 19, 2008

(54) PERIPHERY MONITORING SYSTEM

(75) Inventors: Makoto Nakagawa, Hiroshima (JP);
Hideyuki Okada, Hiroshima (JP);
Michihide Fujiwara, Hiroshima (JP);
Noriaki Mizutani, Nagano (JP)

(73) Assignees: Mazda Motor Corporation, Hiroshima (JP); Circuit Design, Inc., Nagano (JP)

( * ) Notice: Subject to any disclaimer, the term of this patent is extended or adjusted under 35 U.S.C. 154(b) by 239 days.

(21) Appl. No.: 11/338,630

(22) Filed: Jan. 25, 2006

(65) Prior Publication Data
US 2006/0164289 A1    Jul. 27, 2006

(30) Foreign Application Priority Data
Jan. 25, 2005  (JP)  ............................. 2005-016780
Jan. 25, 2005  (JP)  ............................. 2005-016783

(51) Int. Cl.
*G01S 13/62* (2006.01)
(52) U.S. Cl. .................. 342/28; 342/115; 342/116; 342/192; 342/196
(58) Field of Classification Search .............. 342/28, 342/115, 116, 192, 196
See application file for complete search history.

(56) References Cited

U.S. PATENT DOCUMENTS

| 5,471,215 A * | 11/1995 | Fukuhara et al. ............. 342/70 |
| 5,565,870 A * | 10/1996 | Fukuhara et al. ............. 342/70 |
| 6,642,839 B1 * | 11/2003 | Gunderson et al. ......... 340/435 |
| 7,212,150 B2 * | 5/2007 | Blunt et al. .................... 342/91 |
| 2006/0164289 A1 * | 7/2006 | Nakagawa et al. ........... 342/28 |
| 2006/0238408 A1 * | 10/2006 | Blunt et al. .................... 342/91 |

FOREIGN PATENT DOCUMENTS

| EP | 1683693 A1 * | 7/2006 |
| JP | 2004-181982 | 7/2004 |

* cited by examiner

*Primary Examiner*—John B Sotomayor

(57) ABSTRACT

In a periphery monitoring system for monitoring movements of a mobile object around an installation location of a Doppler sensor, a signal output from the Doppler sensor is subjected to an FFT analysis, and a total sum of the frequency levels of all of the frequency bands obtained through the FFT analysis is calculated at predetermined time intervals. A reference level and abnormal level are set based on the calculated total sum. If the calculated total sum exceeds the abnormal level and falls to or below the abnormal level before a first set period passes since the exceeding of the abnormal level, the periphery status is determined to be abnormal. If the total sum exceeds the abnormal level but does not fall to or below the abnormal level even after the first set period passes since the exceeding of the abnormal level, the periphery status is determined to be normal, and the reference level is updated to a new reference level set based on total sums calculated during the first set period.

11 Claims, 10 Drawing Sheets

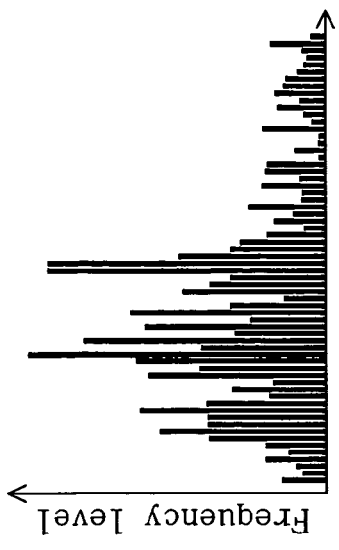
FIG. 3A
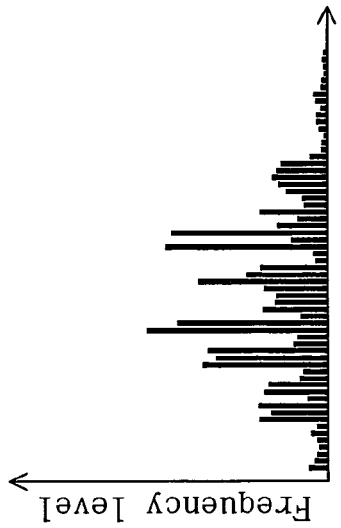
FIG. 3B
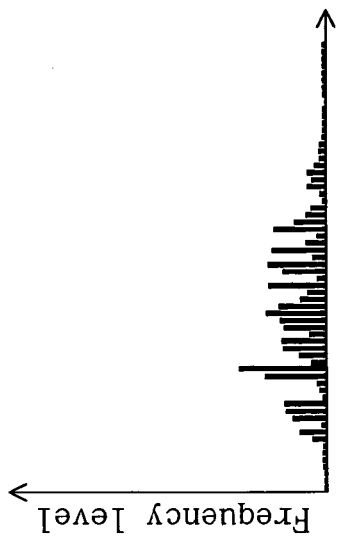
FIG. 3C
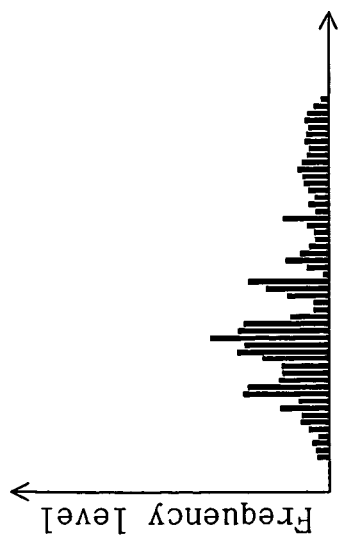
FIG. 3D
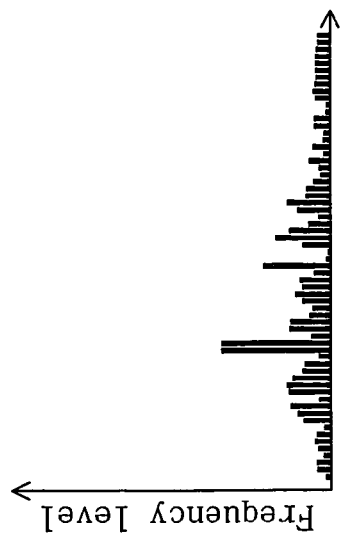
FIG. 3E
FIG. 3F

PERIPHERY MONITORING SYSTEM

CROSS-REFERENCE TO RELATED APPLICATIONS

This application claims priority under 35 U.S.C. §119(a) on Japanese Patent Applications Nos. 2005-016780 and 2005-016783 filed on Jan. 25, 2005, the entire disclosures of the specification, drawings and claims of which are hereby incorporated by reference.

BACKGROUND OF THE INVENTION

1. Field of the Invention

The present invention falls within the technical field relating to a periphery monitoring system which uses a Doppler sensor for monitoring movements of a mobile object around the installation location of the Doppler sensor to estimate, for example, intrusion of the mobile object into a compartment of a vehicle.

2. Description of the Prior Art

Conventionally, a system for detecting intrusion into a compartment of a vehicle wherein when a door of the vehicle is opened the system determines it as an abnormality to give an alarm, for example, has been well known. There has also been a system for detecting intrusion of a human into a vehicle compartment by utilizing a Doppler shift which is caused when the human intrudes into the vehicle compartment as disclosed in, for example, Japanese Laid-Open Patent Publication No. 2004-181982.

However, the above conventional intrusion detection systems can detect intrusion only after a human has intruded into a vehicle compartment, and therefore, it is too late to give an alarm in many cases.

In view of such, utilization of the Doppler shift in Japanese Laid-Open Patent Publication No. 2004-181982 can be further developed into a concept that intrusion of a mobile object, such as a human, or the like, is estimated in advance using a Doppler sensor and, when the possibility of intrusion is expected, some reaction, such as an alarm, or the like, is made. This Doppler sensor emits a transmission wave, such as a micro wave, or the like, and receives a reflection of the transmission wave by an object to output as a signal the shift in frequency between the transmission wave and the reflection wave (which varies according to the moving velocity of the object). The signal output from the Doppler sensor is subjected to an FFT analysis, through which a predetermined frequency range is divided into a predetermined number of frequency bands, each having a predetermined bandwidth. The frequency level is obtained for each frequency band, and movements of a mobile object are grasped based on a variation in the frequency levels of the frequency bands (especially, the total sum of the frequency levels of all of the frequency bands).

However, the Doppler sensor is susceptible to influences of mobile phone waves, radio broadcasting waves, and the like, and has a high possibility of falsely detecting an abnormality because of the influences. For example, when a mobile phone is turned on in the vicinity of a vehicle, the noise level including the wave from the mobile phone increases at the moment, and accordingly, the total sum of the frequency levels of all of the frequency bands increases. This phenomenon is generally the same as that caused when a human approaches to a vehicle and is therefore difficult to distinguish from movement of a human.

SUMMARY OF THE INVENTION

The present invention was conceived in view of the above circumstances. An objective of the present invention is to provide monitoring of movements of a mobile object around a Doppler sensor used as described above wherein, even when noise from a mobile phone wave, or the like, is added to a signal output from the Doppler sensor, movements of the mobile object to be monitored (especially, a human) are accurately grasped such that intrusion of the mobile object into a compartment of a vehicle, or the like, is accurately estimated.

In order to achieve the above objective, according to the present invention, a signal output from the Doppler sensor is subjected to an FFT analysis, and a total sum of the frequency levels of all of the frequency bands which are obtained through the FFT analysis is calculated at predetermined time intervals. A reference level is set based on the calculated total sum, and a predetermined level is added to the reference level to set an abnormal level. If the calculated total sum exceeds the abnormal level and falls to or below the abnormal level before a first set period passes since the exceeding of the abnormal level, the periphery status is determined to be abnormal. If, before the determination of abnormality, the total sum does not exceed the abnormal level or the total sum exceeds the abnormal level but does not fall to or below the abnormal level even after the first set period passes since the exceeding of the abnormal level or if, after the determination of abnormality, the total sum does not exceed the abnormal level continuously for a second set period or more, the periphery status is determined to be normal. If the total sum exceeds the abnormal level but does not fall to or below the abnormal level even after the first set period passes since the exceeding of the abnormal level, the reference level is updated to a new reference level which is set based on a total sum calculated during the first set period.

Specifically, there is provided a periphery monitoring system comprising a Doppler sensor, a signal output from the Doppler sensor being subjected to an FFT analysis such that a predetermined frequency range is divided into a predetermined number of frequency bands, each frequency band having a predetermined bandwidth, a frequency level being calculated for each of the frequency bands, a movement of a mobile object around an installation location of the Doppler sensor being monitored based on the frequency levels of the frequency bands, the system further comprising: a calculation section for calculating a total sum of the frequency levels of all of the frequency bands at predetermined time intervals; a reference level setting section for setting a reference level based on the total sum calculated by the calculation section; an abnormal level setting section for setting an abnormal level by adding a predetermined level to the reference level set by the reference level setting section; and a determination section for determining whether the periphery state is abnormal or normal based on a comparison between the total sum calculated by the calculation section and the abnormal level set by the abnormal level setting section, wherein the determination section is configured such that if the total sum exceeds the abnormal level and falls to or below the abnormal level before a first set period passes since the exceeding of the abnormal level, the determination section determines the periphery status to be abnormal, and if, before the determination of abnormality, the total sum does not exceed the abnormal level or the total sum exceeds the abnormal level but does not fall to or below the abnormal level even after the first set period passes since the exceeding of the abnormal level or if, after the determination of abnormality, the total sum does not exceed the abnormal level continuously for a second set period or more, the determination section determines the periphery status to be normal, and the reference level setting section is configured such that, if the total sum exceeds the abnormal level but does not fall to or below the abnormal level even after the first set period passes since the exceeding of the abnormal level, the reference level setting section updates the reference level to a new reference level which is set based on a total sum calculated during the first set period.

With the above structure, movements of a mobile object to be monitored (especially, a human) can be accurately grasped. In general, a person who attempts to intrude into a compartment of a vehicle comes fairly close to the vehicle and then stands by the vehicle to look inside its compartment. As the person approaches the vehicle, the total sum of the frequency levels of all of the frequency bands increases. Then, when the person stops at a position nearest to the vehicle, the total sum of the frequency levels decreases. As a result, the total sum exceeds the abnormal level and falls to or below the abnormal level before a first set period passes since the exceeding of the abnormal level. Meanwhile, when a mobile phone is turned on in the vicinity of the vehicle, for example, the total sum exceeds the abnormal level but, in general, continues to be higher than that even after the first set period has passed. Therefore, the movements of the human who attempts to intrude into the compartment of the vehicle can readily be distinguished from noise from the mobile phone, or the like, by appropriately setting the first set period. When the total sum does not fall to or below the abnormal level even after the first set period has passed since the exceeding of the abnormal level, the reference level is updated to a new reference level which is set based on the total sum calculated during the first set period. Specifically, the reference level is updated to a level which is generally the same as a normal noise level plus the noise from the mobile phone, or the like. As a result, movements of a human can be accurately grasped even if the output signal from the Doppler sensor includes the noise from the mobile phone, or the like. Thus, intrusion of a mobile object into a compartment of a vehicle, for example, can be accurately estimated.

In the above periphery monitoring system, preferably, if the total sum calculated by the calculation section does not exceed the abnormal level before the determination of abnormality by the determination section or if the total sum does not exceed the abnormal level continuously for a second set period or more after the determination of abnormality, the reference level setting section extends the predetermined time interval as compared with that set at the time of the exceeding of the abnormal level and updates the reference level to a new reference level at a predetermined timing, the new reference level being set based on a plurality of total sums which are calculated before the predetermined timing and which do not exceed the abnormal level.

By thus extending the predetermined time interval, the Doppler sensor is intermittently activated, so that the operation current of the Doppler sensor is decreased. Even when the Doppler sensor is intermittently activated, a particular problem is not caused because the periphery status has already been determined to be normal. Further, even in the "normal" period, the ever-changing noise level is quickly followed by updating the reference level. Therefore, movements of a human can be grasped more accurately.

Preferably, in the setting of the new reference level which is carried out when the total sum calculated by the calculation section does not exceed the abnormal level before the determination of abnormality by the determination section or when the total sum does not exceed the abnormal level continuously for a second set period or more after the determination of abnormality, the reference level setting section does not use a total sum which is out of a predetermined level range in the setting of the new reference level, the predetermined level range being set to include a current reference level.

With the above feature, data obtained at the time of, for example, sudden occurrence of large noise is omitted, so that the reference level can be set with high accuracy.

Preferably, if the total sum calculated by the calculation section exceeds the abnormal level, the reference level setting section does not update the reference level before a determination of normality is made by the determination section.

When the total sum of the frequency levels of all of the frequency bands exceeds the first abnormal level, there is a high possibility that the periphery status is determined to be abnormal. However, if the reference level is updated at this stage, there is a possibility that the determination of abnormality is not made. Even in such a case, according to the present invention, the reference level is not updated when the total sum exceeds the abnormal level, so that the determination of abnormality can be accurately made.

In the above periphery monitoring system, preferably, further comprises a correction section, wherein if at least one of all of the frequency bands whose frequency levels are calculated through the FFT analysis except for frequency bands including the maximum frequency and minimum frequency of the predetermined frequency range is a specific frequency band whose frequency level is equal to or higher than a first set level, when the frequency levels of two frequency bands immediately adjacent to the specific frequency band, one on the higher frequency side and the other on the lower frequency side, are both equal to or lower than the second set level which is lower than the first set level, the correction section decreases the frequency level of the specific frequency band, and when the frequency level of the specific frequency band is decreased by the correction section, the calculation section uses the decreased value for the frequency level of the specific frequency band in the calculation of the total sum of the frequency levels of all of the frequency bands.

The Doppler sensor is susceptible to influences of fluorescent light which has a specific frequency, and the like. Such a frequency component constitutes a disturbance frequency component for the Doppler sensor, so that the frequency level of a frequency band including the frequency of the disturbance frequency component greatly increases. Thus, if there is a disturbance frequency component, there is a higher possibility that estimation of intrusion becomes inaccurate. When a mobile object does not exist in an environment including such a disturbance frequency component, only the frequency level of the frequency band including the disturbance frequency component becomes fairly high as compared with the other frequency bands. When both the frequency levels of two frequency bands immediately adjacent to a specific frequency band which has a frequency level equal to or higher than the first set level (one on the higher side and the other on the lower side) are equal to or lower than the second set level which is lower than the first set level, the specific frequency band is recognized as a frequency band including a disturbance frequency component. Alternatively, when there is a mobile object, the frequency levels of the adjacent frequency bands are as high as that of the specific frequency band even in the presence of a disturbance frequency component. Therefore, if the frequency levels of the adjacent frequency bands are higher than the second set level, it is determined to be a mobile object. Even if there are a plurality of disturbance frequency components, there is some difference in frequency between the disturbance frequency components in general. There is little possibility that adjacent frequency bands become specific bands due to the plurality of disturbance frequency components. Thus, the frequency bands including all the disturbance frequency components can be accurately identified by comparing the frequency level between the specific frequency bands and their adjacent frequency bands. Further, the frequency level of the specific frequency band is decreased by the correction section. Therefore, the influence of the disturbance frequency component is eliminated, and movements of a mobile object to be monitored can be accurately grasped.

Preferably, the correction section sets the frequency level of the specific frequency band to an average value of the frequency levels of the two frequency bands immediately adjacent to the specific frequency band, one on the higher frequency side and the other on the lower frequency side.

With the above feature, the frequency level of a specific frequency band is set to a level substantially equal to a normal noise level, so that movements of a mobile object to be monitored can be grasped more accurately.

In the above periphery monitoring system, preferably, the Doppler sensor is installed in a compartment of a vehicle, and the system monitors a movement of a mobile object around the vehicle to estimate intrusion of the mobile object into the compartment of the vehicle.

With the above feature, movements of a human who attempts to intrude into the compartment of the vehicle are accurately monitored, and intrusion of the human into the compartment of the vehicle can be accurately estimated in advance of intrusion.

BRIEF DESCRIPTION OF THE DRAWINGS

FIG. 3A through FIG. 3F illustrate a change in frequency level of each frequency band where a human approaches to a vehicle from a sideway, stops besides a side door of the vehicle, and then moves away from the vehicle.

DESCRIPTION OF THE PREFERRED EMBODIMENTS

Hereinafter, an embodiment of the present invention is described with reference to the drawings.

Figure 1:
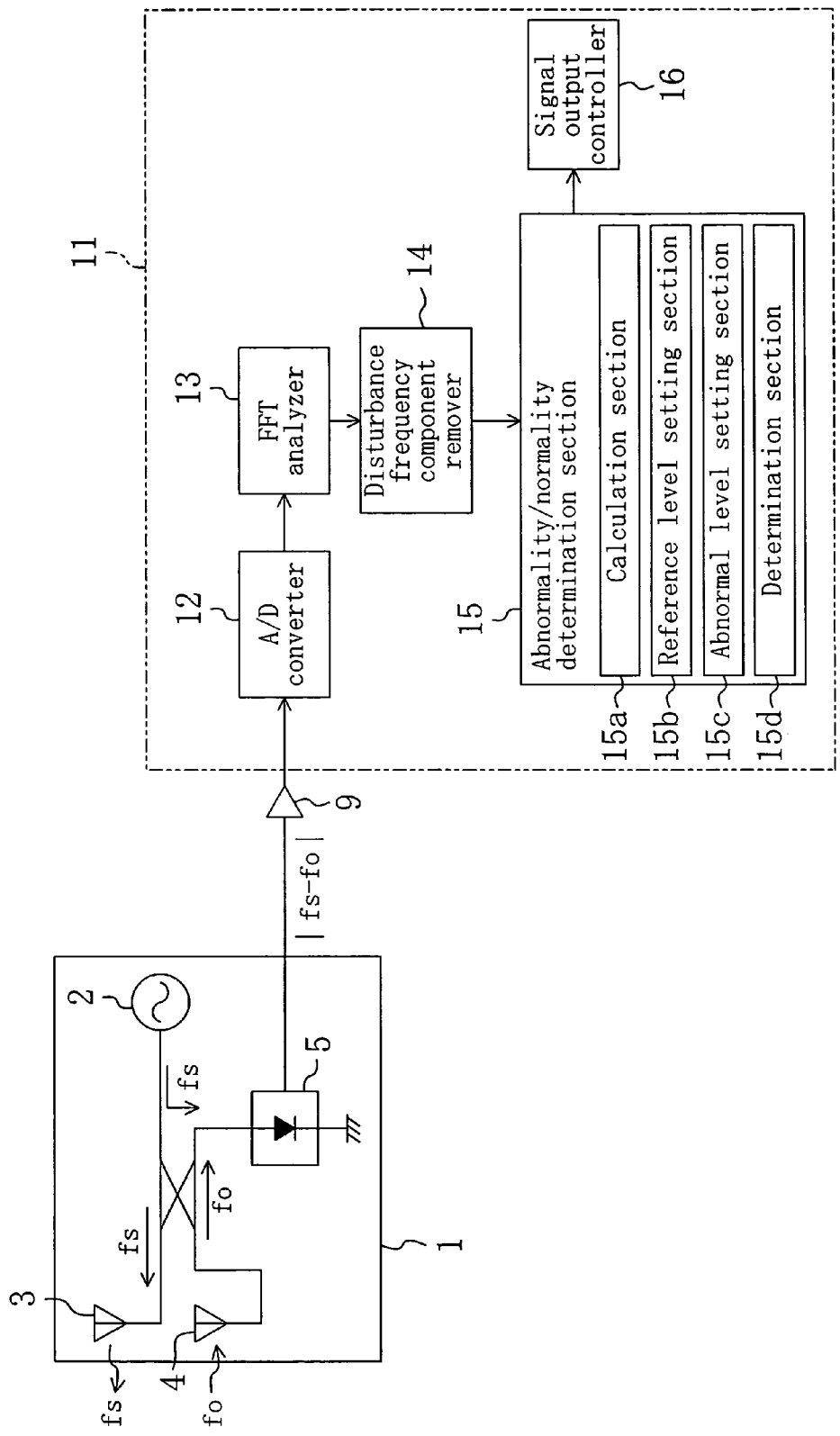
FIG. 1 is a block diagram showing a structure of a periphery monitoring system according to an embodiment of the present invention.

FIG. 1 shows a structure of a periphery monitoring system according to an embodiment of the present invention. This periphery monitoring system includes a Doppler sensor 1 and a controller 11 for determining whether the periphery status is abnormal or normal based on an output signal received from the Doppler sensor 1 and, if it is abnormal, activating an LED, or the like, as an alarm.

The Doppler sensor 1 has a dielectric transmitter 2 for emitting a transmission wave having frequency fs (in this embodiment, a microwave of 24 GHz) through a transmission antenna 3. A reflection of the transmission wave by an object is received by a reception antenna 4. The frequency of this reflection wave, fo, varies according to the moving velocity of the object. In the Doppler sensor 1, a Schottky barrier diode 5 outputs the shift in frequency between the transmission wave and the reflection wave, |fs−fo|, as a signal (an analog signal formed of an offset voltage). Based on this signal, a moving object is detectable, and the moving velocity of the object is also detectable.

Figure 2:
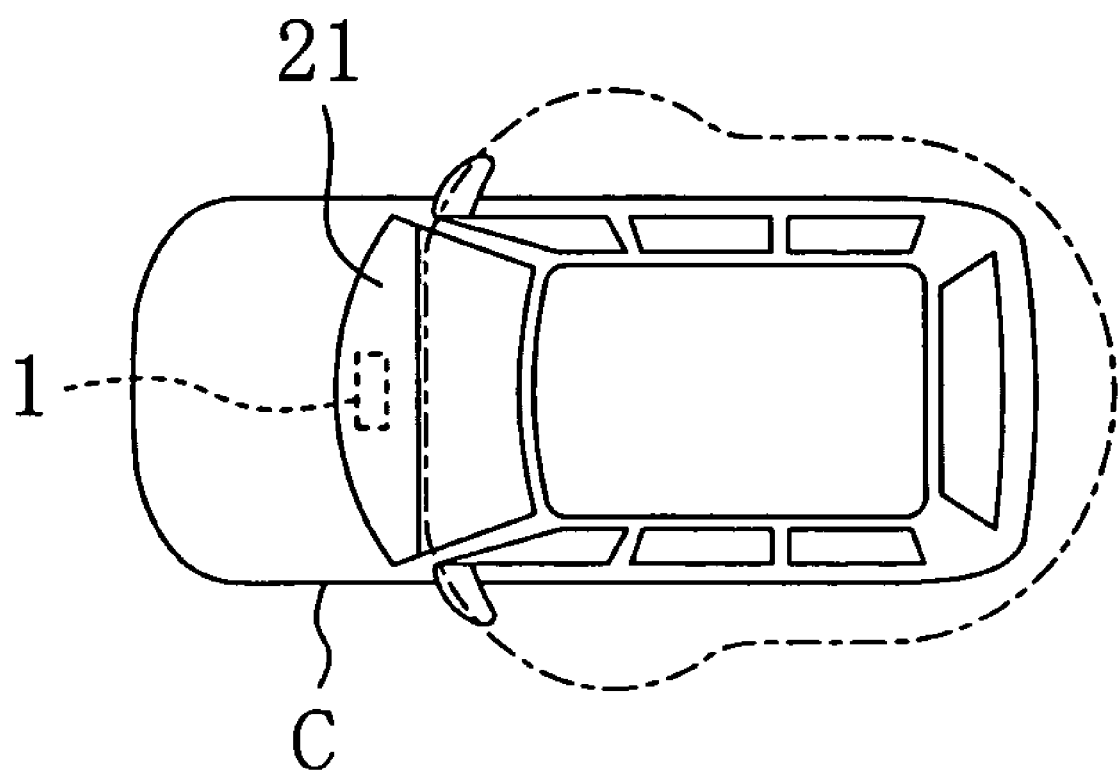
FIG. 2 is a plan view of a vehicle, which shows the installation location and coverage of a Doppler sensor.

As shown in FIG. 2, the Doppler sensor 1 is installed at the vehicle width center of an instrument panel 21 (made of a material which transmits a microwave) provided at the forward end of a compartment of vehicle C (automobile). The area enclosed by a dash-dot line, i.e., the area which covers the vehicle compartment and peripheral regions at the sides and rear of vehicle C (the area of about 1 meter or less around vehicle C), is the detection coverage for mobile objects.

The signal output from the Doppler sensor 1 is amplified by an amplifier 9 and then input to an A/D converter 12 included in the controller 11. The A/D converter 12 converts the analog signal to a digital signal, which is then input to a FFT analyzer 13.

The FFT analyzer 13 FFT-analyzes the signal from the Doppler sensor 1, whereby a predetermined frequency range is divided into a predetermined number of frequency bands, each of which has a predetermined bandwidth, and the frequency level is obtained for each of the frequency bands. This embodiment is based on the assumption that a mobile object is a human, and therefore, the range of 0 to 126 Hz is sufficient for the predetermined frequency range. Herein, it is assumed that the predetermined bandwidth is 2 Hz, and accordingly, the frequency level is obtained for each of 63 frequency bands. It should be noted that, although the predetermined bandwidth of each frequency band is preferably as small as about 1 Hz in view of thorough removal of an influence of disturbance frequency components as will be described later, the predetermined bandwidth is 2 Hz in this embodiment in view of the capacity or operation speed of the controller 11 (the disturbance frequency components are sufficiently reduced even in the case of 2 Hz).

For example, consider a case where a person approaches to vehicle C from a sideway to stop at the vicinity of a side door of vehicle C and then goes away therefrom. In this case, the frequency level of the frequency bands changes as shown in FIG. 3A through FIG. 3F. FIG. 3A illustrates that the person has just entered the detection coverage. As the person approaches vehicle C, the frequency level increases in a plurality of frequency bands including central part of the predetermined frequency range and part slightly lower from the center as shown in FIG. 3B and FIG. 3C, and accordingly, the total sum of the frequency levels of all of the frequency bands (the total energy amount in the predetermined frequency range) also increases. Then, when the person stops at a position nearest to vehicle C, the frequency levels of the above frequency bands whose levels have thus increased decrease, and accordingly, the total sum of the frequency levels of all of the frequency bands decreases. At this point in time, the frequency level of each frequency band is close to a normal noise level. As the person then goes away from that position, the frequency levels of the frequency bands whose levels have increased at the time of the approach increase again to the levels generally equal to those achieved at the time of the approach as shown in FIG. 3E. Thereafter, when the person moves out of the detection coverage, the frequency levels of the level-increased frequency bands decrease as shown in FIG. 3F.

Figure 4:
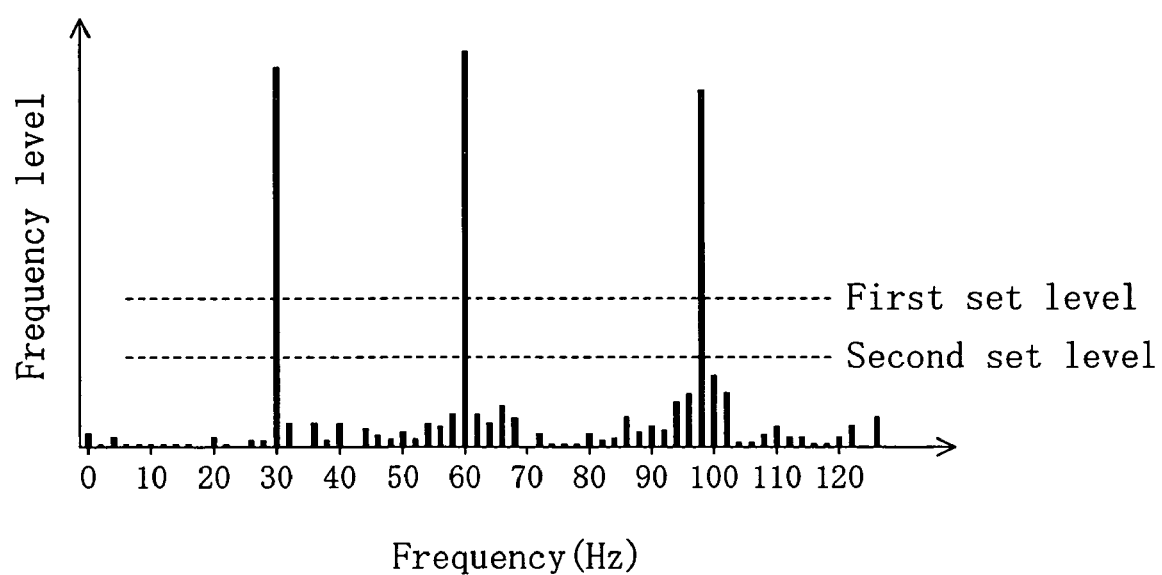
FIG. 4 shows an example of the frequency level of frequency bands where a disturbance frequency component exists.

Now, consider a case where there is a device emitting a wave of a specific frequency which is received by the Doppler sensor 1 as a disturbance frequency component (for example, fluorescent light at 50 Hz or 60 Hz), and no mobile object exists. In this case, for example, as shown in FIG. 4, only the frequency level of a frequency band including the disturbance frequency component (in the example of FIG. 4, three frequency bands including the disturbance frequency components) is equal to or higher than the first set level, while the frequency levels of the other frequency bands are equal to or lower than the second set level which is lower than the first set level (i.e., the frequency levels of the other frequency bands are at normal noise levels). Thus, among all of the frequency bands in which the frequency level has been obtained through the above FFT analysis, except for the frequency bands that include the maximum and minimum frequencies of the predetermined frequency range, when at least one of these frequency bands is a specific frequency band in which the frequency level is equal to or higher than the first set level, and both the frequency levels of two immediately adjacent frequency bands of the specific frequency band (one on the higher side and the other on the lower side) are equal to or lower than the second set level, the specific frequency band is recognized as a frequency band including a disturbance frequency component. Alternatively, when there is a mobile object (human), the frequency levels of the adjacent frequency bands are as high as that of the specific frequency band even in the presence of a disturbance frequency component. Therefore, if the frequency levels of the adjacent frequency bands are higher than the second set level, it is determined to be a mobile object.

The analysis result of the FFT analyzer 13 is input to a disturbance frequency component remover 14 which removes the disturbance frequency component. Specifically, when there is the above-described specific frequency band, it is determined whether or not both the frequency levels of two frequency bands immediately adjacent to the specific frequency band (one on the higher side and the other on the lower side) are equal to or lower than the second set level. If both the frequency levels of the two immediately adjacent frequency bands are equal to or lower than the second set level, the frequency level of the specific frequency band is decreased. That is, the disturbance frequency component remover 14 constitutes a correction section for decreasing the frequency level of the specific frequency band. In this embodiment, the frequency level of the specific frequency band is set to the average of the frequency levels of the two frequency bands immediately adjacent to the specific frequency band (one on the higher side and the other on the lower side). As a result, the disturbance frequency component is decreased to a normal noise level, so that influences of the disturbance frequency component are eliminated. It should be noted that the frequency level of the specific frequency band may be set to a constant level (including 0) in place of being set to the average of the frequency levels of the two immediately adjacent frequency bands.

After the disturbance frequency component has been removed in the disturbance frequency component remover 14, the analysis result of the FFT analyzer 13 is input to an abnormality/normality determination section 15. The abnormality/normality determination section 15 includes: a calculation section 15a for calculating the total sum of the frequency levels of all of the frequency bands at predetermined time intervals (first predetermined time interval or second predetermined time interval which is longer than first predetermined time interval); a reference level setting section 15b for setting a reference level (equivalent to a noise level) based on the total sum calculated by the calculation section 15a; an abnormal level setting section 15c for setting an abnormal level by adding a predetermined level to the reference level; and a determination section 15d for determining whether it is abnormal or normal based on a comparison between the calculated total sum and the abnormal level. When the frequency level of the specific 15 frequency band is decreased by the disturbance frequency component remover 14, the calculation section 15a uses the decreased value for the frequency level of the specific frequency band in the calculation of the total sum of the frequency levels of all of the frequency bands. In this embodiment, the abnormal level setting section 15c sets three different abnormal levels (first to third abnormal levels) as will be described later. It should be noted that all the total sums calculated at the predetermined time intervals are stored in a memory included in the controller 11. The determination result of the determination section 15d is also stored in the memory.

The determination result of the determination section 15d of the abnormality/normality determination section 15 (data stored in the memory) is output to a signal output controller 16. The signal output controller 16 operates to light an LED, to give a sound alarm, or to notify a portable unit that a user of vehicle C is carrying about an abnormality, as will be described later, according to the determination result and the relationship between the total sum (maximum value) and the abnormal level.

The periphery monitoring system of the present embodiment has an abnormal level change dial switch for changing the abnormal levels and a cancel switch for preventing activation of a sound alarm. The user of vehicle C can change the abnormal level (especially, the first abnormal level) to an arbitrary level according to the rotation amount of the abnormal level change dial switch (although the maximum rotation amount is limited). Further, when the cancel switch is activated, a sound alarm is not given even if the periphery status is determined to be abnormal.

For example, when the user of vehicle C activates a keyless locking switch for locking the doors of vehicle C at the time of leaving from parked vehicle C, a start signal is turned ON. When time t1 (a sufficient time for the user of vehicle C to go out of the detection coverage (e.g., 10 seconds)) has passed since the turning-ON of the start signal, the Doppler sensor 1 is turned on to start operations. During time t2 (e.g., 10 seconds) immediately after the start of the operation, the calculation section 15a of the abnormality/normality determination section 15 calculates the total sum of the frequency levels of all of the frequency bands at predetermined time intervals (at this stage, the first predetermined time interval). The reference level setting section 15b averages the total sums calculated during time t2 and sets the average value to the initial reference level. After the initial reference level is set, movements of a mobile object (human) around a location at which the Doppler sensor 1 is installed (around vehicle C) are monitored for estimating intrusion of the mobile object into the compartment of vehicle C. On the other hand, if a keyless unlocking switch is activated for unlocking the doors of vehicle C, the start signal is turned OFF, whereby the monitoring is ceased.

The abnormal level setting section 15*c* of the abnormality/normality determination section 15 sets three different abnormal levels, the first to third abnormal levels, as the above-described abnormal level. The first abnormal level is a level exhibited when a human is approaching to vehicle C as in FIG. 3A, for example, which is the lowest among the first to third abnormal levels. The second abnormal level is a level exhibited when a human reaches a position where he/she can look inside the compartment of vehicle C as in FIG. 3C, for example, which is the second highest level. The third abnormal level is a level exhibited when a human enters the compartment of vehicle C, which is the highest level.

When the total sum calculated with a predetermined time period exceeds the first abnormal level and then falls to or below the first abnormal level before first set period T1 (e.g., 6 seconds) passes since the exceeding of the first abnormal level, the determination section 15*d* of the abnormality/normality determination section 15 determines the periphery status to be abnormal. In general, a person who attempts to intrude into the compartment of vehicle C comes fairly close to vehicle C and then stands by vehicle C to look inside its compartment. Thus, the movement of this person changes as illustrated in FIG. 3A to FIG. 3D, and therefore, the total sum falls to or below the first abnormal level at the time when first set period T1 has passed since the exceeding of the first abnormal level. In this case, the determination section 15*d* determines that the periphery status is abnormal (intrusion is expected, or the possibility of intrusion is high).

After the determination of abnormality, the signal output controller 16 gives a sound alarm or gives a notification of abnormality to the portable unit in addition to the sound alarm. For example, if the maximum value of the total sum is higher than the first abnormal level and equal to or lower than the third abnormal level during a period between the exceeding of the first abnormal level and the falling to or below the first abnormal level, a sound alarm is given for about 5 seconds, but a notification is not given to the portable unit. If the maximum value of the total sum is higher than the third abnormal level during this period, the determination section 15*d* determines it to be highly possible that the person has already intruded into the vehicle compartment, and both the sound alarm and notification to the portable unit are given. During the period when the total sum is higher than the first abnormal level (except for a case where the periphery status is determined to be normal as will be described later), the signal output controller 16 flashes the LED to warn the person not to approach even in the absence of determination of abnormality by the determination section 15*d*. It should be noted that, if the maximum value of the total sum is higher than the second abnormal level during the period between the exceeding of the first abnormal level and the falling to or below the first abnormal level, both the sound alarm and notification to the portable unit may be given.

On the other hand, if, before the determination of abnormality, the total sum does not exceed the first abnormal level or the total sum exceeds the first abnormal level but does not fall to or below the first abnormal level even after first set period T1 passes since the exceeding of the first abnormal level or if, after the determination of abnormality, the total sum does not exceed the first abnormal level continuously for second set period T2 (e.g., generally equal to period T1) or more, the determination section 15*d* determines the periphery status to be normal.

Herein, if the total sum does not exceed the first abnormal level before the determination of abnormality or if the total sum does not exceed the first abnormal level continuously for second set period T2 or more after the determination of abnormality, the time interval for calculation of the total sum is extended as compared with that set at the time of exceeding the first abnormal level (second predetermined time interval (e.g., about 1 second)). Specifically, the Doppler sensor 1 is intermittently activated, and the interval for calculation is extended accordingly. This modification does not cause any particular problem because the periphery status has already been determined to be normal. Further, the operation current of the Doppler sensor 1 is reduced, so that the current consumption can be reduced. When the total sum exceeds the first abnormal level, the Doppler sensor 1 is continuously activated, and the interval for calculation is shortened to the first predetermined time interval.

If the total sum does not exceed the first abnormal level before the determination of abnormality or if the total sum does not exceed the first abnormal level continuously for second set period T2 or more after the determination of abnormality, the reference level is updated to a new reference level at a predetermined timing. The new reference level is determined based on a plurality of previously-calculated total sums which do not exceed the first abnormal level. For example, at the timing when the total sum has been calculated ten times, the ten total sums (excluding ones that do not satisfy a certain condition as will be described later) are averaged, and the average value is set to the new reference level. In this process, a total sum which is out of a predetermined level range including the current reference level is not used in setting the new reference level. This is for the purpose of omitting data obtained at the time of, for example, sudden occurrence of large noise such that the reference level is determined with high accuracy. If the total sum does not exceed the first abnormal level, at the timing when the total sum has been calculated another ten times, the ten total sums are averaged, and the average value is set to the new reference level. It should be noted that, in this embodiment, when the difference between the new reference level and the current reference level is equal to or greater than a predetermined value (especially when the new reference level is greater than the current reference level by a predetermined value or more), the reference level is not updated to the new reference level. This is because there is a possibility that the average value is increased due to a person existing near vehicle C, and it is necessary to monitor the person although he can be just a passerby so that the periphery status is not clearly determined to be abnormal. That is, there is a possibility that the determination of abnormality is not made when the reference level is increased, and therefore, the reference level is not updated.

If the total sum exceeds the first abnormal level but does not fall to or below the first abnormal level even after first set period T1 passes since the exceeding of the first abnormal level, the reference level is also updated based on a new reference level which is determined based on total sums calculated during first set period T1 (in this process, the update is carried out irrespective of the difference between the new reference level and the current reference level). Specifically, the fact that the total sum is higher than the first abnormal level during first set period T1 or more is not determined to mean that a person approaching vehicle C stops to look inside the compartment but is determined to mean that the noise level is increased due to the influence of a wave from a mobile phone, or the like, and accordingly, the reference level is updated to the increased level. In this case also, for example, the update may be carried out such that a plurality of total sums calculated during first set period T1 are averaged, and the average value is set to the new reference level. As a result of the update of the reference level, the first to third abnormal levels are increased, and accordingly, the total sum does not exceed the first abnormal level, so that the periphery status is determined to be normal. With this arrangement, the Doppler sensor 1 is intermittently activated.

On the other hand, when the total sum exceeds the first abnormal level, the reference level is not updated before the determination of normality is made. This is because there is a possibility that the determination of abnormality is not made if the reference level is updated at this stage even though there is a high possibility that the periphery status is determined to be abnormal when the total sum exceeds the first abnormal level.

Figure 5:
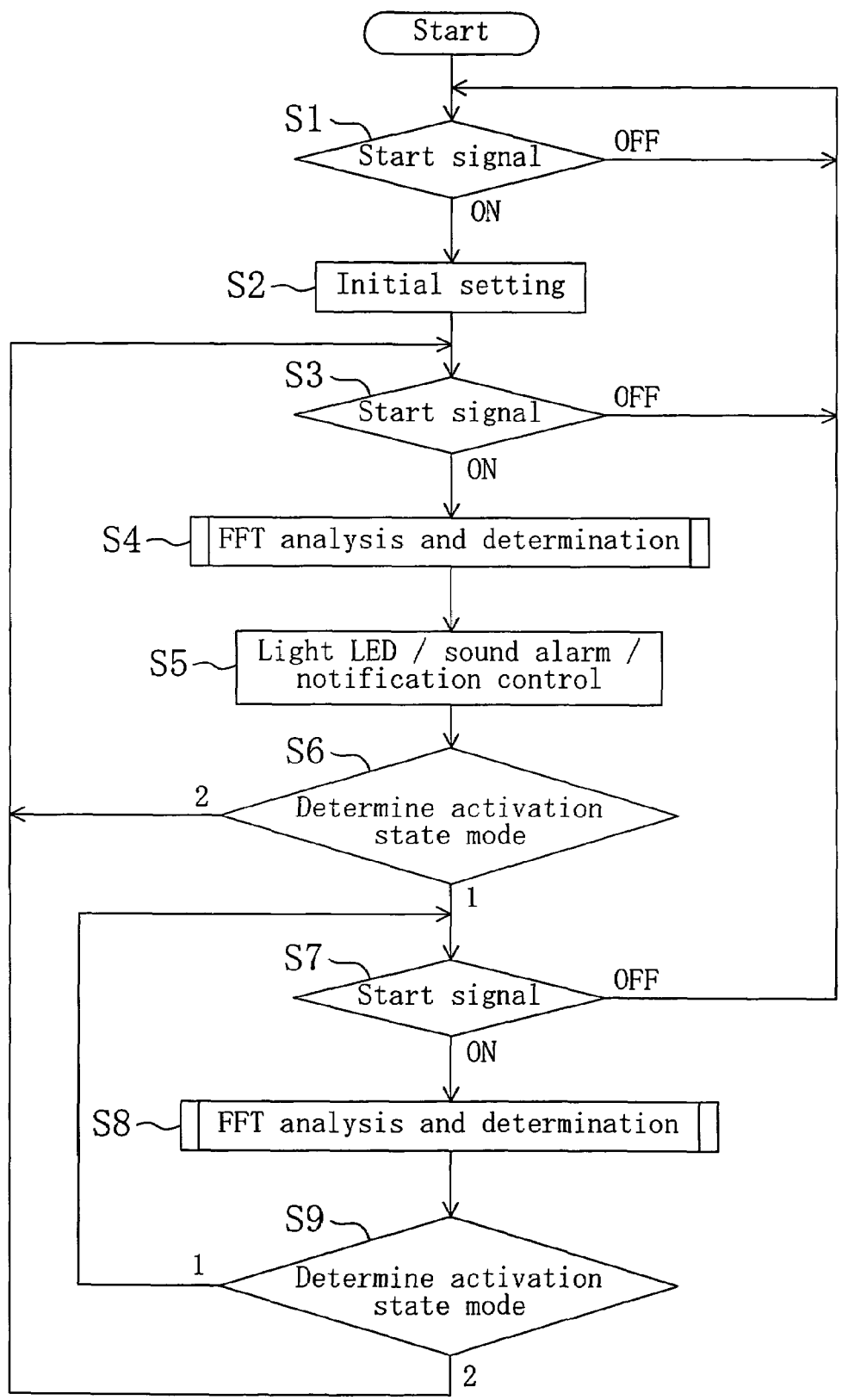
FIG. 5 is a flowchart illustrating a control operation of a controller.

Next, the basic control operation of the controller is described with reference to the flowchart of FIG. 5.

First, at step S1, it is determined whether the start signal is ON or OFF. If the start signal is ON, the control operation proceeds to step S2. If the start signal is OFF, the operation of step S1 is repeated.

At step S2, an initial setting operation is carried out while an LED is flashed till time t1 passes since the turning-ON of the start signal. The initial settings are specifically as follows. The predetermined level which is to be added to the reference level in the setting of the abnormal levels is changed according to the rotation amount of the abnormal level change dial switch. The system is set, according to the status of the cancel switch, to the alarm mode where a sound alarm is given at the time of determination of abnormality or the non-alarm mode where a sound alarm is not given. The activation state mode is set to "0". Herein, the activation state mode is set to "0" only during time t2 immediately after the activation of the Doppler sensor 1 (during which the Doppler sensor 1 is continuously activated), whereas the activation state mode is set to "1" when the Doppler sensor 1 is intermittently activated, and the activation state mode is set to "2" when the Doppler sensor 1 is continuously activated. After the FFT analysis and determination process (step S4), which will be described later, is once performed, the activation state mode is set to "1" or "2" according to the activation state of the Doppler sensor 1.

At step S3, the state of the start signal is determined. If the start signal is ON, the control operation proceeds to step S4. If the start signal is OFF, the control operation returns to step S1.

At step S4, the FFT analysis and determination process, which will be described later in detail, is performed in the FFT analyzer 13, the disturbance frequency component remover 14, and the abnormality/normality determination section 15. At step S5, the signal output controller 16 operates to light an LED, to give a sound alarm, or to send a notification of an abnormality to a portable unit according to the determination result obtained in the FFT analysis and determination process and the relationship between the total sum (maximum value) of frequency levels of all of the frequency bands and the abnormal level.

At step S6, the activation state mode is determined. If the activation state mode is "1", the control operation proceeds to step S7. If the activation state mode is "2", the control operation returns to step S3.

At step S7, the ON/OFF state of the start signal is determined. If the start signal is ON, the control operation proceeds to step S8. If the start signal is OFF, the control operation returns to step S1.

At step S8, the FFT analysis and determination process is performed as in step S4. At step S9, the activation state mode is determined. If the activation state mode is "1", the control operation returns to step S7. If the activation state mode is "2", the control operation returns to step S3.

Figure 6:
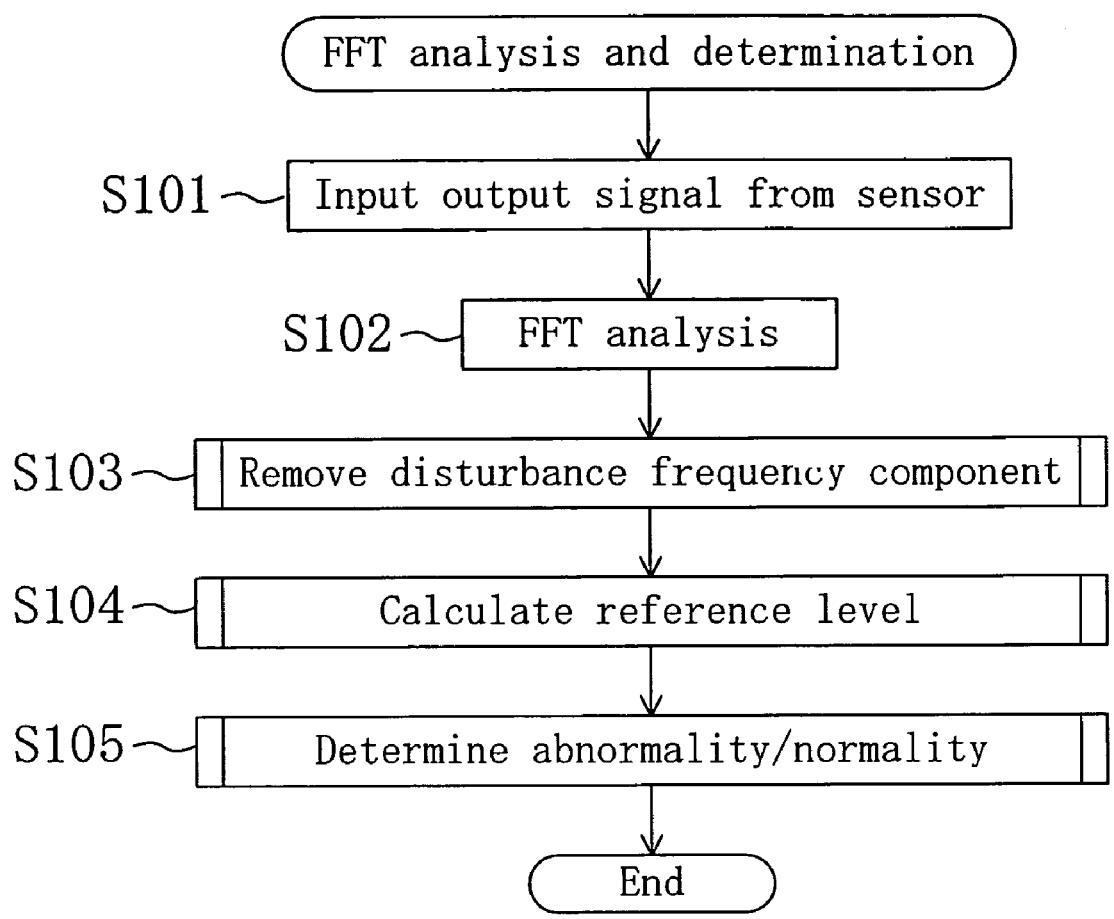
FIG. 6 is a flowchart illustrating a specific procedure of a FFT analysis and determination process.

The FFT analysis and determination process performed at step S4 and step S8 is specifically as illustrated in FIG. 6.

At step S101, an output signal from the Doppler sensor 1 is input. At step S102, the output signal from the Doppler sensor 1 is subjected to the FFT analysis in the FFT analyzer 13, whereby a predetermined frequency range (0 to 126 Hz) is divided into a predetermined number (63) of frequency bands, each of which has a constant bandwidth (2 Hz), and the frequency level is obtained for each of the frequency bands.

Figure 7:
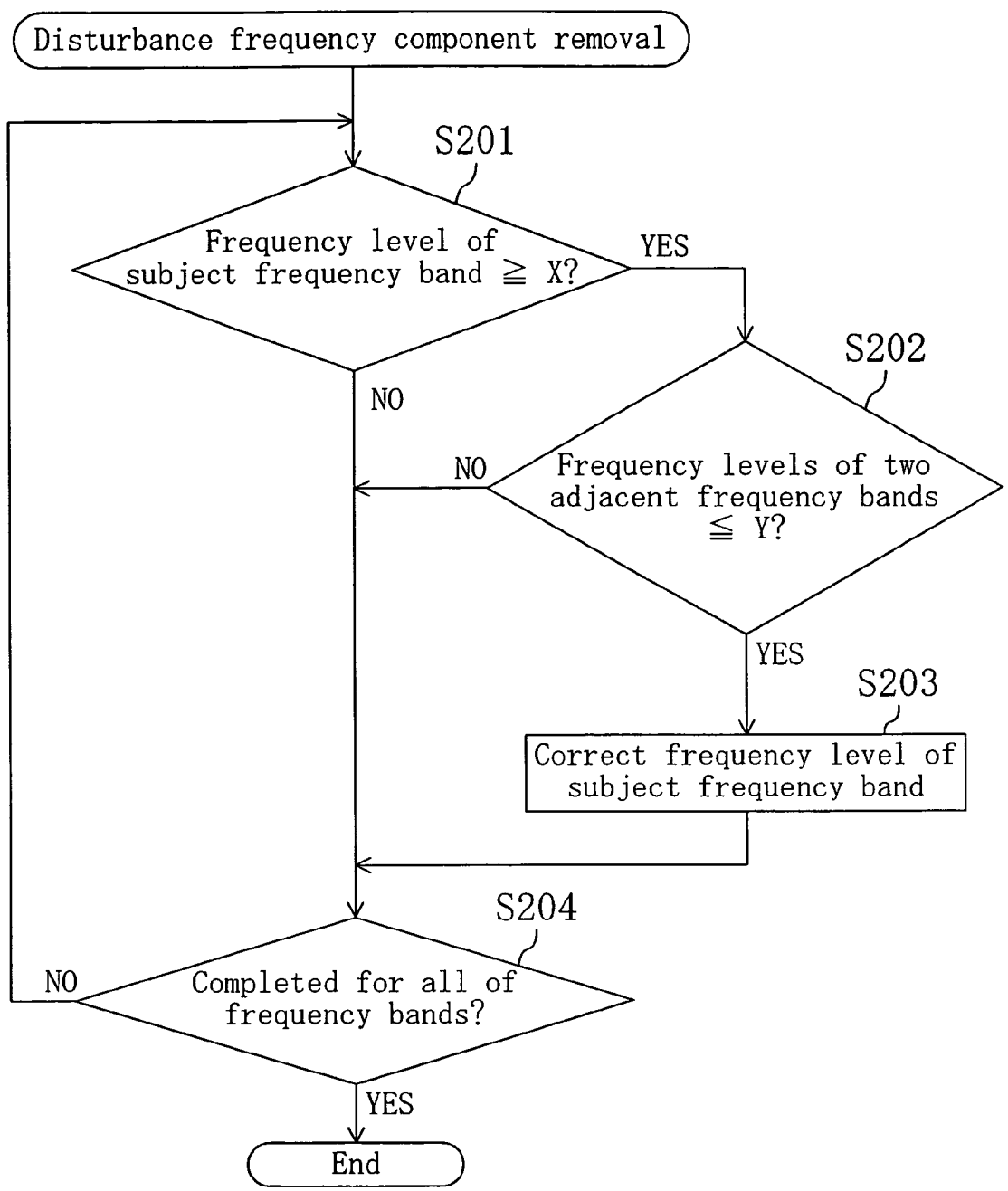
FIG. 7 is a flowchart illustrating a specific procedure of a disturbance frequency component removing process.

At step S103, the disturbance frequency component removing process is performed in the disturbance frequency component remover 14. The details of the disturbance frequency component removing process are illustrated in FIG. 7. The disturbance frequency component removing process is sequentially performed on each of the frequency bands except for the frequency bands that include the maximum frequency and minimum frequency of the predetermined frequency range.

At step S201, it is determined whether or not the frequency level of a subject frequency band is equal to or higher than first set level X. If YES (if the subject frequency band is a specific frequency band), the process proceeds to step S202. If NO (if the subject frequency band is not a specific frequency band), the process proceeds to step S204.

At step S202, it is determined whether or not the frequency levels of two frequency bands immediately adjacent to the subject frequency band (one on the higher frequency side and the other on the lower frequency side) are equal to or lower than second set level Y. If YES, the process proceeds to step S203 and thereafter proceeds to step S204 at an appropriate timing. If NO, the process directly proceeds to step S204.

At step S203, the frequency level of the frequency band is corrected. Specifically, the frequency level of the frequency band is set to the average value of the frequency levels of the two adjacent frequency bands as described above.

At step S204, it is determined whether or not the processes of steps S201 to S203 are completed for all of the frequency bands (except for the frequency bands that include the maximum frequency and minimum frequency of the predetermined frequency range). If NO, the disturbance frequency component removing process returns to step S201, and the processes of steps S201 to S203 are performed on the next frequency band. If YES, the disturbance frequency component removing process is ended.

Due to the disturbance frequency component removing process, the influence of a disturbance frequency component, such as fluorescent light, or the like, is eliminated, so that the determination of abnormality/normality can be accurately carried out in the abnormality/normality determination section 15.

Figure 8:
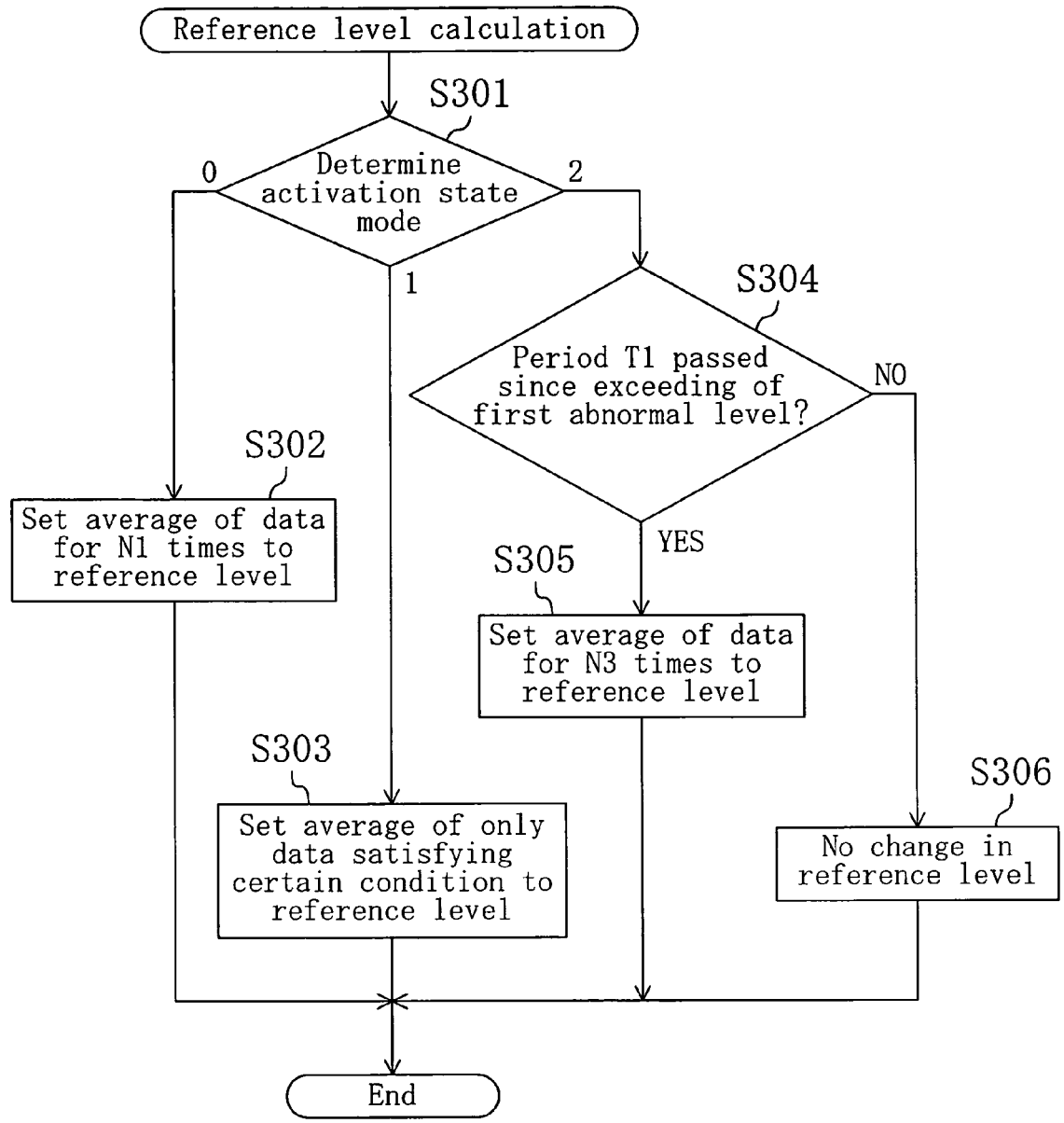
FIG. 8 is a flowchart illustrating a specific procedure of a reference level calculation process.

Returning to the flowchart of FIG. 6, at step S104, a reference level calculation process is performed in the abnormality/normality determination section 15. Details of the reference level calculation process are illustrated in FIG. 8.

At step S301, the activation state mode is determined. If the activation state mode is "0", the process proceeds to step S302. At step S302, the data for N1 times of calculations (N1 is the number of times of calculation performed during time t2) is averaged (in the reference level calculation process, the total sum of the frequency levels of all of the frequency bands is referred to as "data"), and the resultant average value is set to the reference level. Thereafter, the reference level calculation process is ended at an appropriate timing.

If the activation state mode is "1", the process proceeds to step S303. At step S303, among the data for N2 times (e.g., 10 times) of calculation, the average value of only data which satisfy a certain condition is set to the new reference level. The data which satisfy a certain condition means data which is included in the predetermined level range including the current reference level. That is, as described above, data which does not fall within the predetermined level range including the current reference level (for example, data obtained at the time of sudden occurrence of large noise) is not used in setting the new reference level. In this way, the reference level is updated to the new reference level, and thereafter, the reference level calculation process is ended at an appropriate timing.

If the activation state mode is "2", the process proceeds to step S304. At step S304, it is determined whether or not first set period T1 has passed since the exceeding of the first abnormal level. If YES, the process proceeds to step S305, and thereafter, the reference level calculation process is ended at an appropriate timing. If NO, the process proceeds to step S306, and thereafter, the reference level calculation process is ended at an appropriate timing.

At step S305, the average of the data for N3 times of calculations (the number of times of calculation performed during period T1) is set to the new reference level. At step S306, on the other hand, the reference level is maintained (i.e., not updated).

Returning to the flowchart of FIG. 6 again, at step S105, an abnormality/normality determination process is performed in the abnormality/normality determination section 15. Thereafter, the FFT analysis and determination process is ended at an appropriate timing.

Figure 9:
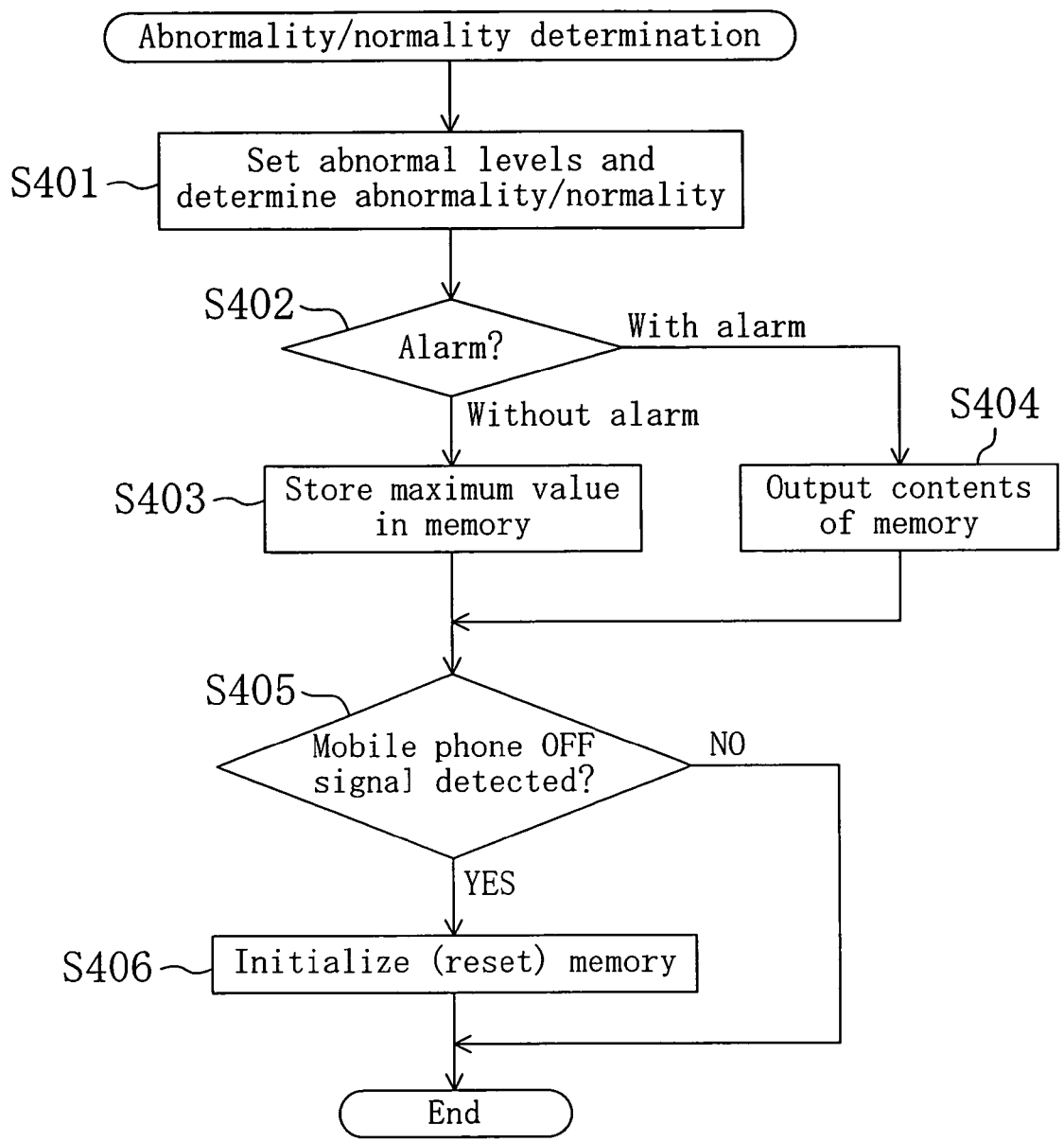
FIG. 9 is a flowchart illustrating a specific procedure of a normality/abnormality determination process.

The abnormality/normality determination process is carried out as specifically illustrated in FIG. 9. At step S401, the predetermined level (a level changed according to the rotation amount of the abnormal level change dial switch) is added to the reference level set as described above, whereby the abnormal levels (first to third abnormal levels) are set. The total sum of the frequency levels of all of the frequency bands is compared with the abnormal levels, whereby it is determined whether the periphery status is abnormal or normal. This determination result is stored in a memory.

At step S402, it is determined whether the system is set to the alarm mode or the non-alarm mode. If the system is set to the non-alarm mode, the process proceeds to step S403 and thereafter proceeds to step S405 at an appropriate timing. If the system is set to the alarm mode, the process proceeds to step S404 and thereafter proceeds to step S405 at an appropriate timing.

At step S403, the maximum value of the total sum of the frequency levels of all of the frequency bands is stored in the memory, and the contents of the memory are not output to the signal output controller 16. At step S404, on the other hand, the contents of the memory are output to the signal output controller 16.

At step S405, it is determined whether or not an OFF signal of a mobile phone is detected. If YES, the process proceeds to step S406. At step S406, the memory is initialized (reset), and thereafter, the abnormality/normality determination process is ended at an appropriate timing. If NO, the abnormality/normality determination process is simply ended. It should be noted that the determination at step S405 is made based on whether or not the total sum of the frequency levels of all of the frequency bands is decreased by a certain level or more. Specifically, when the total sum of the frequency levels of all of the frequency bands is decreased by a certain level or more, it is determined that an OFF signal of the mobile phone has been detected because, if the mobile phone is ON, the total sum of the frequency levels of all of the frequency bands is increased due to a wave from the mobile phone, whereas if the mobile phone is OFF, the total sum of the frequency levels of all of the frequency bands is abruptly decreased.

Next, a basic example of the operation of the above-described periphery monitoring system is described with reference to the timing chart of FIG. 10.

First, a user of vehicle C activates the keyless locking switch to turn ON the start signal. After time t1 has passed since the turning-ON of the start signal, the Doppler sensor 1 is turned ON to start its operation. During the period of time t2 after the start of the operation of the Doppler sensor 1, the total sum of the frequency levels of all of the frequency bands is calculated at predetermined time intervals (first predetermined time intervals). A number (N1) of total sums obtained during time t2 are averaged, and this average value is set to the initial reference level. In FIG. 10, the initial reference level is set to A.

It is assumed herein that the user goes entirely out of the detection coverage of the Doppler sensor 1 during time t1.

After the lapse of time t2, movement of a mobile object (human) around the location where the Doppler sensor 1 is installed (around vehicle C) is monitored. In the example of FIG. 10, the total sums calculated at the predetermined time intervals do not exceed the first abnormal level which has been set based on the reference level (and the rotation amount of the abnormal level change dial switch). Therefore, the periphery status is determined to be normal. During this period, the Doppler sensor 1 is intermittently activated, and the time interval for calculating the total sum is the second predetermined time interval. At the timing when the total sum has been calculated N2 times, the N2 total sums (excluding ones that are out of the predetermined level range) are averaged, and the average value is set to the new reference level. In the example of FIG. 10, the reference level is sequentially updated to B, C, and subsequent levels. (Although as the reference level is updated the levels in the row of "Variation in total sum" of FIG. 10, i.e., 'reference level', 'first abnormal level', etc., change accordingly, the change of the reference level is small and is therefore not depicted in FIG. 10.)

Figure 10:
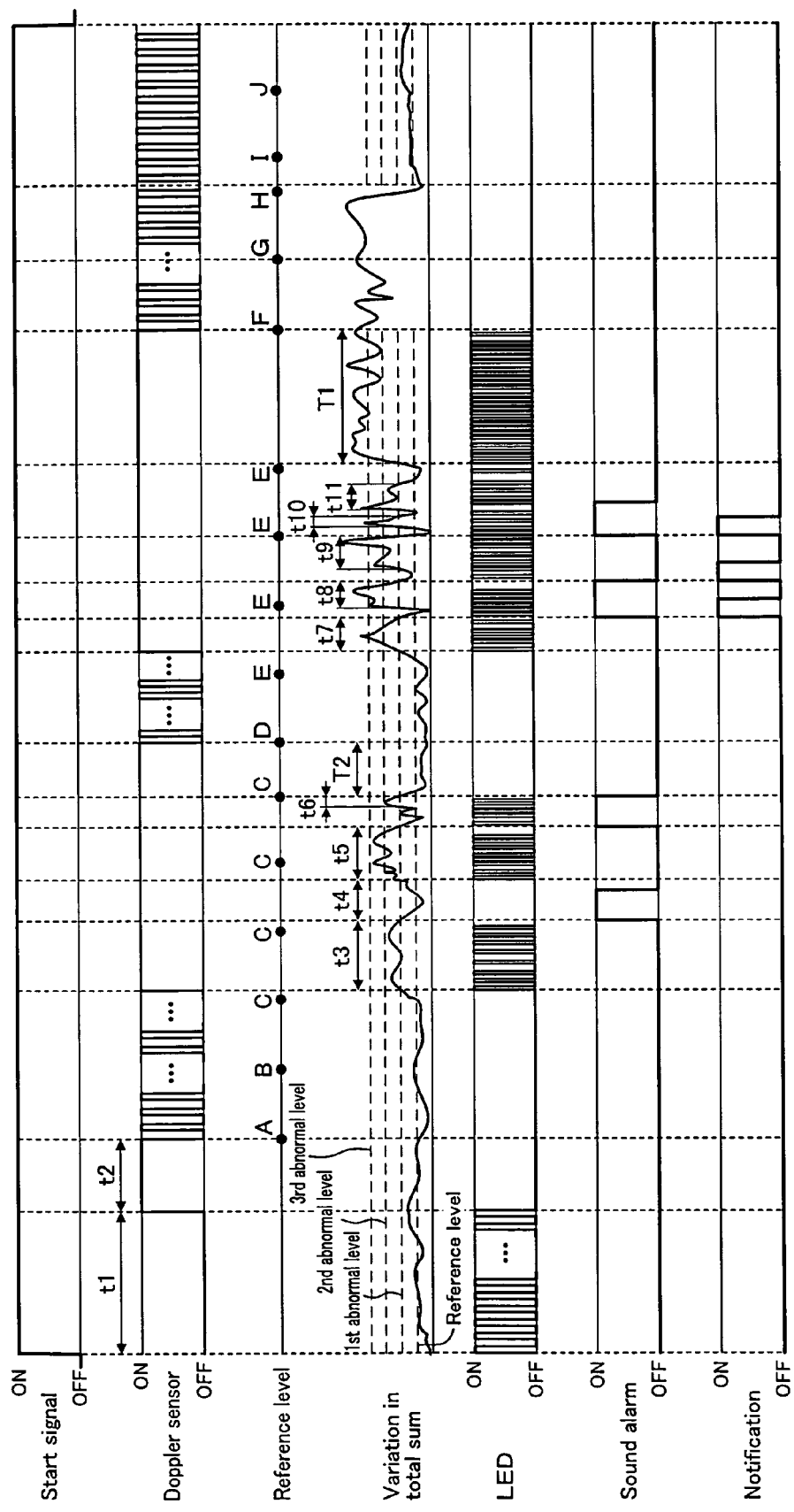
FIG. 10 is a timing chart illustrating a basic example of an operation of a periphery monitoring system.

In the example of FIG. 10, it is assumed that the total sum exceeds the first abnormal level after the reference level has been updated to level C. Accordingly, an LED is flashed. The Doppler sensor 1 enters a continuously-activated state, and the predetermined time interval for calculating the total sum is changed to the first predetermined time interval. The reference level remains at level C.

When time t3 (<T1) has passed since the exceeding of the first abnormal level, the total sum falls to or below the first abnormal level. That is, the total sum falls to or below the first abnormal level before period T1 passes since the exceeding of the first abnormal level. The maximum value of the total sum during the period of time t3 is higher than the first abnormal level and equal to or lower than the third abnormal level. Thus, the periphery status is determined to be abnormal, and a sound alarm is given. However, a notification is not given to a portable unit.

When time t4 (<T2) has passed since the determination of abnormality, the total sum again exceeds the first abnormal level. Accordingly, the LED flashes again. When time t5 (<T1) has passed since the exceeding of the first abnormal level, the total sum falls to or below the first abnormal level, so that the second abnormality determination is made, and a sound alarm is given. Since the maximum value of the total sum during the period of time t5 is also higher than the first abnormal level and equal to or lower than the third abnormal level, a notification is not given to a portable unit. In the example of FIG. 10, the total sum again exceeds the first abnormal level during the sound alarm given as a result of the second abnormality determination and then falls to or below the first abnormal level when the period of time t6 (<T1) has passed since the exceeding of the first abnormal level, and accordingly, the third abnormality determination is made. Even if an abnormality determination is made during the sound alarm in this way, another sound alarm is not given based on this abnormality determination.

Thereafter, in the example of FIG. 10, the total sum does not exceed the first abnormal level continuously for period T2 or more after the third abnormality determination, so that the periphery status is determined to be normal. As a result, the Doppler sensor 1 enters an intermittently-activated state, and the predetermined time interval for calculating the total sum is changed to the second predetermined time interval. The reference level is updated to new reference level D. Reference level D is set based on the total sums calculated during period T2 which do not exceed the first abnormal level. For a while after that, the total sum does not exceed the first abnormal level. Therefore, the determination of normality is continued, and the reference level is updated to level E.

Then, in the example of FIG. 10, the total sum exceeds the first abnormal level after the update of the reference level to level E. Accordingly, the LED flashes. The Doppler sensor 1 enters a continuously-activated state, and the predetermined time interval for calculating the total sum is changed to the first predetermined time interval. The reference level remains at level E.

When time t7 (<T1) has passed since the exceeding of the first abnormal level, the total sum falls to or below the first abnormal level. At this time, the maximum value of the total sum exceeds the third abnormal level. As a result, the fourth abnormality determination is made, so that a sound alarm is given, and a notification is given to the portable unit.

Then, the abnormality determination is made four times (t8, t9, t10, and t11 are each shorter than T1). Thereafter, the total sum again exceeds the first abnormal level and stays higher than the first abnormal level for period T1 or more after the exceeding of the first abnormal level. As a result, it is determined that the noise level has increased due to the influence of a wave from a mobile phone, or the like, and the periphery status is determined to be normal. Because of this determination of normality, flashing of the LED is ceased, the Doppler sensor 1 enters an intermittently-activated state, and the predetermined time interval for calculating the total sum is changed to the second predetermined time interval.

Further, the reference level is updated to new reference level F which is set based on the total sums calculated during period T1.

When the reference level is updated to level F, the reference level greatly changes so that the abnormal levels become much higher than before. Therefore, even if the total sum is at a high level, the total sum does not exceed the first abnormal level. As a result, the determination of normality continues, and the reference level is sequentially updated to G, H, and subsequent levels.

In the example of FIG. 10, around the timing of updating the reference level to level H, the total sum of the frequency levels of all of the frequency bands decreases by a certain level or more within a certain time period. As a result, an OFF signal of the mobile phone is detected, so that the memory is reset. In addition, the average value of total sums obtained after the reset through a plurality of times of calculation (a smaller number of times than a normal case for the purpose of immediately decreasing the reference level (e.g., 5 times)) is newly set to the reference level. In FIG. 10, the reference level is updated to level I. As a result, the reference level is generally equal to the initial reference level, i.e., level A, and the abnormal levels are generally equal to the initial abnormal levels.

Thereafter, the total sum does not exceed the first abnormal level, and the reference level is updated to level J. The user returns to vehicle C to activate the keyless unlocking switch, whereby the start signal is turned OFF, so that the monitoring is ceased.

Therefore, in this embodiment, when the periphery status is determined to be normal, the reference level is updated to a new reference level. When the total sum of the frequency levels of all of the frequency bands exceeds an abnormal level, the reference level is not updated before the determination of normality is made. Therefore, the reference level, which is a noise level, can be appropriately set. Even if noise from a mobile phone, or the like, is added to an output signal from the Doppler sensor 1, the determination of normality/abnormality can be accurately carried out. Thus, movements of the mobile object to be monitored (human) can be accurately grasped, so that intrusion of the mobile object into a compartment of vehicle C can be accurately estimated.

In this embodiment, the Doppler sensor 1 is installed in the compartment of vehicle C for monitoring movements of a mobile object (human) around vehicle C. However, the installation location of the Doppler sensor 1 is not limited to the inside of the compartment but may be any place. For example, it is possible to install the Doppler sensor 1 at the entrance of a house, or the like, for estimating intrusion of a mobile object into the house.

The present invention is not limited to the above-described examples of this embodiment but is applicable to any periphery monitoring system which uses a Doppler sensor and performs a FFT analysis on an output signal of the Doppler sensor.

What is claimed is:

1. A periphery monitoring system comprising a Doppler sensor, a signal output from the Doppler sensor being subjected to an FFT analysis such that a predetermined frequency range is divided into a predetermined number of frequency bands, each frequency band having a predetermined bandwidth, a frequency level being calculated for each of the frequency bands, a movement of a mobile object around an installation location of the Doppler sensor being monitored based on the frequency levels of the frequency bands, the system further comprising:

a calculation section for calculating a total sum of the frequency levels of all of the frequency bands at predetermined time intervals;

a reference level setting section for setting a reference level based on the total sum calculated by the calculation section;

an abnormal level setting section for setting an abnormal level by adding a predetermined level to the reference level set by the reference level setting section; and a determination section for determining whether the periphery state is abnormal or normal based on a comparison between the total sum calculated by the calculation section and the abnormal level set by the abnormal level setting section, wherein the determination section is configured such that
if the total sum exceeds the abnormal level and falls to or below the abnormal level before a first set period passes since the exceeding of the abnormal level, the determination section determines the periphery status to be abnormal, and if, before the determination of abnormality, the total sum does not exceed the abnormal level or the total sum exceeds the abnormal level but does not fall to or below the abnormal level even after the first set period passes since the exceeding of the abnormal level or if, after the determination of abnormality, the total sum does not exceed the abnormal level continuously for a second set period or more, the determination section determines the periphery status to be normal, and the reference level setting section is configured such that, if the total sum exceeds the abnormal level but does not fall to or below the abnormal level even after the first set period passes since the exceeding of the abnormal level, the reference level setting section updates the reference level to a new reference level which is set based on a total sum calculated during the first set period.

2. The periphery monitoring system of claim 1, wherein if the total sum calculated by the calculation section does not exceed the abnormal level before the determination of abnormality by the determination section or if the total sum does not exceed the abnormal level continuously for a second set period or more after the determination of abnormality, the reference level setting section extends the predetermined time interval as compared with that set at the time of the exceeding of the abnormal level and updates the reference level to a new reference level at a predetermined timing, the new reference level being set based on a plurality of total sums which are calculated before the predetermined timing and which do not exceed the abnormal level.

3. The periphery monitoring system of claim 2 wherein, in the setting of the new reference level which is carried out when the total sum calculated by the calculation section does not exceed the abnormal level before the determination of abnormality by the determination section or when the total sum does not exceed the abnormal level continuously for a second set period or more after the determination of abnormality, the reference level setting section does not use a total sum which is out of a predetermined level range in the setting of the new reference level, the predetermined level range being set to include a current reference level.

4. The periphery monitoring system of claim 2, wherein if the total sum calculated by the calculation section exceeds the abnormal level, the reference level setting section does not update the reference level before a determination of normality is made by the determination section.

5. The periphery monitoring system of claim 1, further comprising a correction section, wherein if at least one of all of the frequency bands whose frequency levels are calculated through the FFT analysis except for frequency bands including the maximum frequency and minimum frequency of the predetermined frequency range is a specific frequency band whose frequency level is equal to or higher than a first set level, when the frequency levels of two frequency bands immediately adjacent to the specific frequency band, one on the higher frequency side and the other on the lower frequency side, are both equal to or lower than the second set level which is lower than the first set level, the correction section decreases the frequency level of the specific frequency band, and when the frequency level of the specific frequency band is decreased by the correction section, the calculation section uses the decreased value for the frequency level of the specific frequency band in the calculation of the total sum of the frequency levels of all of the frequency bands.

6. The periphery monitoring system of claim 5, wherein the correction section sets the frequency level of the specific frequency band to an average value of the frequency levels of the two frequency bands immediately adjacent to the specific frequency band, one on the higher frequency side and the other on the lower frequency side.

7. The periphery monitoring system of claim 1, wherein:
the Doppler sensor is installed in a compartment of a vehicle; and
the system monitors a movement of a mobile object around the vehicle to estimate intrusion of the mobile object into the compartment of the vehicle.

8. A periphery monitoring system comprising a Doppler sensor, a signal output from the Doppler sensor being subjected to an FFT analysis such that a predetermined frequency range is divided into a predetermined number of frequency bands, each frequency band having a predetermined bandwidth, a frequency level being calculated for each of the frequency bands, a movement of a mobile object around an installation location of the Doppler sensor being monitored based on the frequency levels of the frequency bands, the system further comprising:

a calculation section for calculating a total sum of the frequency levels of all of the frequency bands at predetermined time intervals;

a reference level setting section for setting a reference level based on the total sum calculated by the calculation section;

an abnormal level setting section for setting an abnormal level by adding a predetermined level to the reference level set by the reference level setting section; and a determination section for determining whether the periphery state is abnormal or normal based on a comparison between the total sum calculated by the calculation section and the abnormal level set by the abnormal level setting section, wherein the determination section is configured such that
if the total sum exceeds the abnormal level and falls to or below the abnormal level before a first set period passes since the exceeding of the abnormal level, the determination section determines the periphery status to be abnormal, and if, before the determination of abnormality, the total sum does not exceed the abnormal level or the total sum exceeds the abnormal level but does not fall to or below the abnormal level even after the first set period passes since the exceeding of the abnormal level or if, after the determination of abnormality, the total sum does not exceed the abnormal level continuously for a second set period or more, the determination section determines the periphery status to be normal, and the reference level setting section is configured such that if the total sum exceeds the abnormal level but does not fall to or below the abnormal level even after the first set period passes since the exceeding of the abnormal level, the reference level setting section updates the reference level to a new reference level which is set based on a total sum calculated during the first set period but, after the exceeding of the abnormal level, does not update the reference level before a determination of normality is made by the determination section, and if the total sum calculated by the calculation section does not exceed the abnormal level before the determination of abnormality by the determination section or if the total sum does not exceed the abnormal level continuously for a second set period or more after the determination of abnormality, the reference level setting section extends the predetermined time interval as compared with that set at the time of the exceeding of the abnormal level and updates the reference level to a new reference level at a predetermined timing, the new reference level being set based on a plurality of total sums which are calculated before the predetermined timing and which do not exceed the abnormal level, and the reference level setting section does not use a total sum which is out of a predetermined level range in the setting of the new reference level, the predetermined level range being set to include a current reference level.

9. The periphery monitoring system of claim 8, further comprising a correction section, wherein if at least one of all of the frequency bands whose frequency levels are calculated through the FFT analysis except for frequency bands including the maximum frequency and minimum frequency of the predetermined frequency range is a specific frequency band whose frequency level is equal to or higher than a first set level, when the frequency levels of two frequency bands immediately adjacent to the specific frequency band, one on the higher frequency side and the other on the lower frequency side, are both equal to or lower than the second set level which is lower than the first set level, the correction section decreases the frequency level of the specific frequency band, and when the frequency level of the specific frequency band is decreased by the correction section, the calculation section uses the decreased value for the frequency level of the specific frequency band in the calculation of the total sum of the frequency levels of all of the frequency bands.

10. The periphery monitoring system of claim 9, wherein the correction section sets the frequency level of the specific frequency band to an average value of the frequency levels of the two frequency bands immediately adjacent to the specific frequency band, one on the higher frequency side and the other on the lower frequency side.

11. The periphery monitoring system of claim 8, wherein:

the Doppler sensor is installed in a compartment of a vehicle; and the system monitors a movement of a mobile object around the vehicle to estimate intrusion of the mobile object into the compartment of the vehicle.

* * * * *